United States Patent
Gunasekera

(10) Patent No.: US 10,092,866 B2
(45) Date of Patent: Oct. 9, 2018

(54) ASSEMBLY OF MAGNET FOR OIL FILTER CASE

(71) Applicant: Darren Aster Gunasekera, Kuala Lumpur (MY)

(72) Inventor: Darren Aster Gunasekera, Kuala Lumpur (MY)

( * ) Notice: Subject to any disclaimer, the term of this patent is extended or adjusted under 35 U.S.C. 154(b) by 156 days.

(21) Appl. No.: 14/851,737

(22) Filed: Sep. 11, 2015

(65) Prior Publication Data

US 2016/0074782 A1    Mar. 17, 2016

(30) Foreign Application Priority Data

Sep. 12, 2014 (MY) .......................... PI 2014702611

(51) Int. Cl.
| | |
|---|---|
| *B01D 35/06* | (2006.01) |
| *B01D 35/30* | (2006.01) |
| *B03C 1/28* | (2006.01) |

(52) U.S. Cl.
CPC .............. *B01D 35/06* (2013.01); *B01D 35/30* (2013.01); *B03C 1/288* (2013.01)

(58) Field of Classification Search
CPC ........ B01D 35/06; B65D 45/18; B65D 45/22; B03C 1/288; B03C 1/28; F16B 2/24
See application file for complete search history.

(56) References Cited

U.S. PATENT DOCUMENTS

| | | | | |
|---|---|---|---|---|
| 2,074,475 | A * | 3/1937 | Jesser .................... | B65D 45/18 217/69 |
| 3,460,679 | A * | 8/1969 | Llewellyn .............. | B01D 35/06 184/6.25 |
| 5,556,540 | A   | 9/1996 | Brunsting | |
| 5,647,993 | A * | 7/1997 | Karp ...................... | B01D 35/06 210/223 |
| 5,714,063 | A * | 2/1998 | Brunsting .............. | B01D 35/06 210/222 |

(Continued)

FOREIGN PATENT DOCUMENTS

MY           131072 A       7/2007

OTHER PUBLICATIONS

UW MRSEC Education Group "Refrigerator Magnets" 2006 http://education.mrsec.wisc.edu/background/fridgemag/index.html.*

*Primary Examiner* — David C Mellon
*Assistant Examiner* — Liam Royce

(57) ABSTRACT

The present invention describes an assembly of magnets to be coupled to oil filter case to attract ferrous material. Oil filter case [20] takes the shape of a cylinder. Magnet [22] has two poles and one of the poles is coupled to the side of oil filter case [20]. A steel member [24] is provided to couple only the other pole of the magnet [22] with the oil filter case [20]. The steel member [24] comprises a pivot unit [26] that couples the pole of magnet, a pivot extender [28] which couples the pivot unit [26] and a bridge [30] that couples the pivot extender [28] with oil filter case [20]. The magnet assembly directs the magnetic field from outward pole towards the oil filter to create a pseudo horse shoe magnet effect.

1 Claim, 1 Drawing Sheet

(56) References Cited

U.S. PATENT DOCUMENTS

| | | | |
|---|---|---|---|
| 8,845,461 B2 * | 9/2014 | Duke | A63B 69/0071 473/447 |
| 2014/0353218 A1 * | 12/2014 | Soukka | B03C 1/032 209/214 |

* cited by examiner

ASSEMBLY OF MAGNET FOR OIL FILTER CASE

The current application claims a foreign priority to application number PI 2014702611 filed on Sep. 12, 2014 in Malaysia.

TECHNICAL FIELD

The present invention relates generally to an assembly for removing ferrous material from oil, especially to an assembly of magnets for removing ferrous particles from oil.

BACKGROUND ART

Vehicle engine operates at high temperature, high revolution per minute and at extreme conditions. Engine wear happens between engine moving parts and engine oil is used to provide lubrication between engine moving parts to reduce engine wear. Friction between steel moving parts produces ferrous particles.

An oil filter is used to remove the ferrous particles. Oil filter uses a strainer in the form of metal or paper to remove ferrous particles and other contaminants. Some of these ferrous particles are smaller than the mesh size of the filter element, thus, these microscopic ferrous particles can bypass the filter element, and as the result causes more abrasive wear. Vehicles need to change engine oil and oil filter regularly to maintain the engine.

Magnets are introduced to the oil filter to remove ferrous particles. A magnet is placed near the oil filter inlet to attract ferrous material. It was found that magnet can reduce these ferrous particles.

Initially, magnets were built in as part of an oil filter. Used oil filter are always disposed. Regular changing and disposal of oil filter with magnet is not resource friendly. Magnets need not to be disposed as it is still capable to attract ferrous material.

U.S. Pat. No. 5,556,540 disclosed an external magnetic assembly for an oil filter. The assembly includes a ferrous flux band. The band is provided with few magnetic members arranged next to each other so that it has alternating regions of polarity. The magnetic band can be attached by itself to the casing of oil filter, which is usually made of steel. The band can be detached from the oil filter when the oil filter needs to be replaced. Hence, the same band can be used again for every oil change.

MY 131,072 described another external magnetic assembly for an oil filter. The assembly includes a band with few adjustable housing units so that it can be adapted into a band having different radius so that it can fit most sizes of oil filter case. Each housing unit is provided with a disc magnet. Hence, disc magnets are placed at a distance along a circumference of the casing. The assembly can be retained in every oil filter change.

Magnets are limited resource and the price of magnet is not stable. In view of conserving the number of magnets to be used while maintaining effective removal of ferrous material, an improved assembly for oil filter is proposed.

SUMMARY OF INVENTION

The present invention introduces an improved assembly of magnets for oil filter case. Magnets have two poles. The assembly provides a magnetic path for outward facing pole of magnet to be channeled back to the oil filter case. A steel member is used to direct magnetic field from the outward facing pole to the oil filter case. The steel member is adapted to couple only the other pole of the magnet and to be coupled to the oil filter case. It was found that directing additional magnetic field to the oil filter case can increase the attraction of ferrous metal to the oil filter case.

Oil filter comes in various radius sizes. The steel member can be adapted to pivot at the outward facing pole of magnet while still maintaining contact with the oil filter case so that the steel member can channel magnetic field to the oil filter case. The steel member comprises a pivot unit that couples the pole of magnet, a pivot extender which couples the pivot unit and a bridge that couples the pivot extender with the oil filter case.

Each magnet and steel member are provided with adaptable band case to adapt the assembly to fit different oil filters having different radius size. The housing covers the rest of the steel so that only the pivot part is in contact with the outward facing pole of magnet and the magnetic path is in contact with the oil filter case.

BRIEF DESCRIPTION OF DRAWINGS

The present invention will now be described in greater detail, by way of an example, with reference to the accompanying drawing, in which.

DESCRIPTION OF EMBODIMENTS

Figure 1:
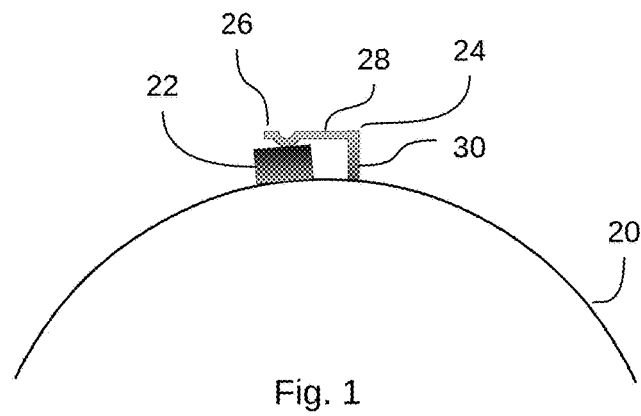
FIG. 1 illustrates a magnet and steel member, according to an embodiment of the invention.

Oil filter case [20] takes the shape of a cylinder. Referring to FIG. 1, there is illustrated a magnet [22] on the side of the oil filter case [20]. The case is usually made of steel. Hence, magnet [22] is secured on the case [20] using magnetic force.

Magnet [22] has two poles. One pole faces the oil filer case [20] while the other pole faces outward. Magnetic field is created around both poles and magnetizes the oil filter case [20].

The outward facing pole can be tapped to direct magnetic field towards the oil filter case [20]. A steel member [24] is used to direct magnetic field towards the oil filter case [20]. The steel member [24] has to be in contact only with the outward facing pole of the magnet and oil filter case [20].

Oil filter is made in various radius sizes. In order to maintain contact between the magnet pole and oil filter wall, the steel member [24] is adapted to maintain constant contact between these surfaces.

The steel member [24] has three parts: a pivot unit [26], a pivot extender [28] and a bridge unit [30]. The pivot unit [26] is placed near the outward facing pole and it allows the steel member [24] to be pivoted. The pivot extender [28] couples the pivot unit and provides a magnetic field path from the pole of the magnet. A bridge unit [30] connects the pivot extender with oil filter wall to provide a magnetic field path back to the oil filter case. Note that the steel member touches one part of the magnet only and divert that magnetic field to one part of the oil filter case.

The pivot unit [26] is important in this assembly so that the steel member [24] can be adapted to fit onto oil filter magnet of various sizes. The magnet sticks on a radius line while the bridge unit sits on a different radius line. The magnetic coupling of outward facing pole with the oil filter wall can increase magnetic attraction of ferrous material. This arrangement creates a pseudo horseshoe magnet effect.

Horseshoe magnet brings two magnetic poles close to each other to create a stronger magnetic field.

Figure 2:
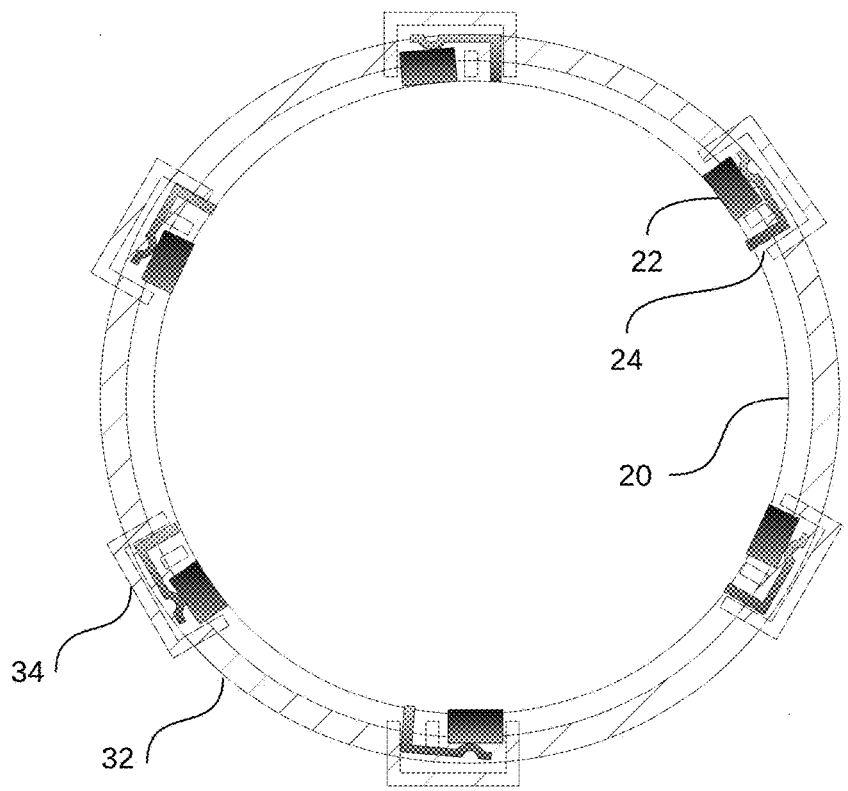
FIG. 2 illustrates an embodiment of assembly of magnets for oil filter.

A plurality of magnets can be arranged along the circumference of the cylinder case [20], as shown in FIG. 2. Each magnet [22] is paired with steel members [24] to tap outward facing pole back to oil filter case. A band case 32 comprises a plurality of body members 34. Each of the plurality of body members 34 is used to hold a corresponding magnet 22 and a corresponding steel member 24.

In one embodiment of assembly having two to eight magnets [22] and two to eight steel members [24], the magnets are arranged so that the same pole will face the oil filter case. Hence, the opposite pole of the magnets will be tapped by steel member [24] to provide a magnetic field path back to the oil filter case.

The magnets and steel member are provided with adjustable band case and the radius of the band can be adjusted to fit many sizes of oil filter. One embodiment of the band case is provided in Malaysia patent MY 131,072.

Accordingly, a magnet assembly for oil filter is described. The magnet assembly directs the magnetic field from outward pole towards the oil filter wall to create a pseudo horse shoe magnet effect.

The invention claimed is:

1. A magnet system comprising:
    a magnet;
    a steel member;
    a band;
    a steel case;
    the magnet and the steel member each being magnetically attached to the steel case;
    the steel member rotatably contacting against the magnet;
    the steel member revolvably contacting against the steel case;
    the steel case being of cylindrical-shaped;
    the band comprising a first body member and a second body member;
    the first body member holding the magnet and the steel member;
    the second body member being adjustable in radius size with respect to the steel case;
    the magnet comprising a first pole and a second pole;
    the first pole and the second pole being located opposite to each other along the magnet;
    the first pole being one of a north pole and a south pole;
    the second pole being the other of the north pole and the south pole;
    the first pole being magnetically attached to the steel case;
    the second pole being magnetically attached to the steel member;
    the steel member comprising a pivot unit, a pivot extender and a bridge;
    the pivot extender being connected in between the pivot unit and the bridge;
    the pivot unit being magnetically attached to the second pole;
    the pivot unit rotatably contacting against the second pole;
    the bridge being magnetically attached to the steel case;
    the bridge revolvably contacting against the steel case;
    the bridge being separate from the magnet via the pivot extender;
    in response to the first pole being magnetically attached to the steel case, and in response to the pivot unit rotatably contacting against the second pole, the bridge revolvably contacting against the steel case around the magnet; and
    in response to the first pole and the bridge each being magnetically attached to the steel case, and in response to the pivot unit being magnetically attached to the second pole, a pseudo horse shoe magnet effect being created by a magnetic field path being directed from the second pole through the pivot unit, the pivot extender and the bridge to the steel case.

* * * * *